US009606897B2

(12) United States Patent
Lehavi et al.

(10) Patent No.: US 9,606,897 B2
(45) Date of Patent: Mar. 28, 2017

(54) PARSING AN IMAGE OF A VISUALLY STRUCTURED DOCUMENT

(75) Inventors: David Lehavi, Haifa (IL); Omer Barkol, Haifa (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 1254 days.

(21) Appl. No.: 13/162,063

(22) Filed: Jun. 16, 2011

(65) Prior Publication Data

US 2012/0324333 A1 Dec. 20, 2012

(51) Int. Cl.
*G06F 17/27* (2006.01)
*G06F 11/36* (2006.01)
*G06F 11/34* (2006.01)

(52) U.S. Cl.
CPC ...... *G06F 11/3668* (2013.01); *G06F 11/3612* (2013.01); *G06F 11/3438* (2013.01); *G06F 17/2705* (2013.01)

(58) Field of Classification Search
CPC .. G06F 17/2247; H04L 41/22; H04N 1/00429
USPC .................................. 715/771, 853
See application file for complete search history.

(56) References Cited

U.S. PATENT DOCUMENTS

| 6,308,222 | B1 * | 10/2001 | Krueger ..................... G06F 8/65 348/E5.105 |
| 7,162,084 | B2 | 1/2007 | Herley et al. |
| 8,479,138 | B1 * | 7/2013 | Lawson et al. ............... 716/126 |
| 2002/0013812 | A1 * | 1/2002 | Krueger ................. G06F 8/65 709/203 |
| 2005/0246451 | A1 * | 11/2005 | Silverman ........... G11B 27/034 709/231 |
| 2007/0118357 | A1 * | 5/2007 | Kasravi et al. ................. 704/10 |
| 2007/0234213 | A1 * | 10/2007 | Krikorian ........ H04N 21/23406 715/716 |
| 2009/0006643 | A1 * | 1/2009 | Lee .................. H04N 21/23424 709/231 |
| 2010/0251163 | A1 | 9/2010 | Keable |
| 2011/0099498 | A1 * | 4/2011 | Barkol et al. ................ 715/771 |

OTHER PUBLICATIONS

Bergman et al. (Semantic Automation from Screen Capture, published Jul. 21, 2009, pp. 1-11.*
Barkol et al. (Semantic Automation from Screen Capture, published Jul. 21, 2009, pp. 1-11.*

(Continued)

*Primary Examiner* — Stephen Hong
*Assistant Examiner* — Ahamed I Nazar
(74) *Attorney, Agent, or Firm* — Pearl Cohen Zedek Latzer, LLP

(57) ABSTRACT

A method for automated semantic parsing of an image of a structured document includes acquiring the image of the structured document. The image of the structured document is lexed so as to associate each image element of a plurality of image elements of the image with a predefined token. A user defined template of expected semantically significant elements of the structured document is input into a parser, the expected elements being defined in a visibly pushdown language (VPL) format. The tokens are parsed into the expected elements. A computer readable medium containing executable instructions and a system are also described.

18 Claims, 6 Drawing Sheets

(56) References Cited

OTHER PUBLICATIONS

Alur et al. (Visibly Pushdown Languages, published 2004, pp. 1-23).*
Emmanuel Filiot et al.; "On Functionality of Visibly Pushdown Transducers"; Universit'e Libre de Bruxelles and Universit'e de Provence; Feb. 7, 2010.
Emmanuel Filiot; "Properties of Visibly Pushdown Transducers"; 35th International Symposium on Mathematical Foundations of Computer Science, Brno, Czech Republic (2010); Jun. 15, 2010.
Jean Berstel; "A Scalable Formal Method for Design and Automatic Checking of User Interfaces"; ICSE 2001, Int. Conference on Software Engineering, Toronto, Ontario, Canada, May 12-19, 2001, IEEE Press, New York , 453-462.

* cited by examiner

PARSING AN IMAGE OF A VISUALLY STRUCTURED DOCUMENT

BACKGROUND

A graphic user interface (GUI), typically includes a collection of objects, such as screen controls, that are displayed on a display screen of a computer. The correct interpretation of the displayed objects is generally apparent to a properly trained human operator who interacts with the GUI.

For the purpose of some applications, it is necessary that the displayed objects of the GUI be automatically interpreted. Examples of such applications include automatic software testing, where an automatic software testing application may automatically interact with the GUI. Other examples include user monitoring (where an interaction of the user with the GUI is interpreted), speech activation devices, automatic generation of user interfaces for disabled people, and GUI design. Such an application may be required, for example, to automatically identify a screen control of the GUI without access to an object model of the screen controls.

Similar operations may be required in interpreting and extracting information from a visually structured document, such as a Portable Document Format (PDF) document.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

DETAILED DESCRIPTION

In accordance with an embodiment of the invention, an image of a structured document is automatically parsed using parsing rules that are expressed in terms of a visibly pushdown language (VPL) format. The result of the automatic parsing is a semantic representation of the document, in which a semantically significant interpretation is assigned to components of the document. For example, such a semantic representation may be useful for in automatic software testing, in monitoring a user, or in automatically interpreting a document.

A structured document image is to be understood herein as referring to any image that includes one or more visual structure components. Such a structured document image may be understood broadly to include a GUI with one or more screen controls, as well as a visually structured document such as a PDF document.

In applying automatic parsing in accordance with an embodiment of the invention, lexical analysis, (referred to as "lexing"), is performed on the structured document image. Lexing the image may divide the image into individual image elements. Each image element may be identified with an element from a predefined set of image elements, referred to as a token. The identification of image elements with tokens may be performed in a probabilistic or tentative manner. Thus, an initial lexing into tokens may be subject to modification during application of the parsing rules. Thus, automatic parsing in accordance with an embodiment of the invention may be robust and self-correcting with respect to an initial misidentification of tokens, and with respect to minor changes in the image.

A set of parsing rules that define a template of expected semantically significant image elements is expressed or defined in terms of a visibly pushdown language (VPL) format. A VPL compiler converts the parsing rules to a VPL graph for application to the lexed tokens. The VPL parsing rules and the resulting graph enable defining a hierarchal structure of aligned elements (e.g. a set of radio buttons). The tokens are assumed to be bounded by natural bounding rectangles. The parsing rules may assume, for example, that rectangularly bound components of a screen control, such as a radio button set, are aligned in a predetermined manner.

Application of the VPL graph to the tokens may associate each token with one of the expected elements. The VPL graph may enable identifying groups of tokens that are logically associated with one another. Thus, a parsing of the image is obtained, in which the tokens are interpreted to yield a semantic representation of the image. In the semantic representation of the image, various elements of the image are provided a semantically significant interpretation.

Figure 1:
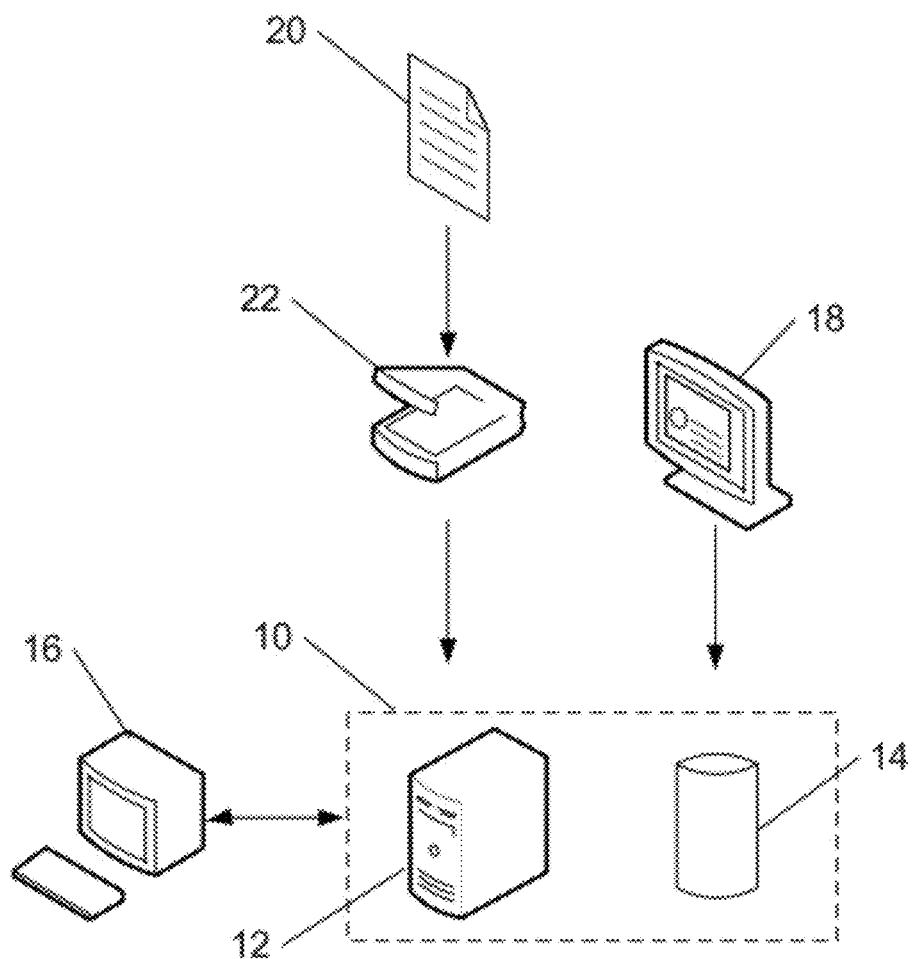
FIG. 1 shows a schematic diagram of a system for automatic parsing of an image of a structured document, in accordance with an embodiment of the invention.

FIG. 1 shows a schematic diagram of a system for automatic parsing of an image of a structured document, in accordance with an embodiment of the invention. Automatic parsing system 10 includes a processor 12 and data storage device 14. Processor 12 may include one or more intercommunicating computers or similar processors capable of operating in response to programmed instructions. Data storage device 14 may include one or more fixed or removable memory or data storage devices that are accessible by processor 12. For example, data storage device 14 may store programming instructions for the operation of processor 12. Data storage device 14 may be used for temporary or long-term storage of input data, or of results of calculations that are performed by processor 12. As a result of a software or hardware configuration, processor 12 may incorporate several functional modules. The functional modules may occupy a common device or region of the processor (e.g. a memory device), or may be logically or physically partitioned from one another.

Automatic parsing system 10 may acquire image input on which to operate using an image acquiring device. For example, automatic parsing system 10 may receive a captured digital representation of visual data that is displayed on a display screen 18. Display screen 18 may represent a monitor of a computing system on which a GUI is displayed. Automatic parsing system 10 may receive an image of a document 20 that is represented in a digital format. For example, document 20 may have been created in a digital image format (e.g. PDF), or a physical document may have been scanned by a scanner 22.

Figure 2:
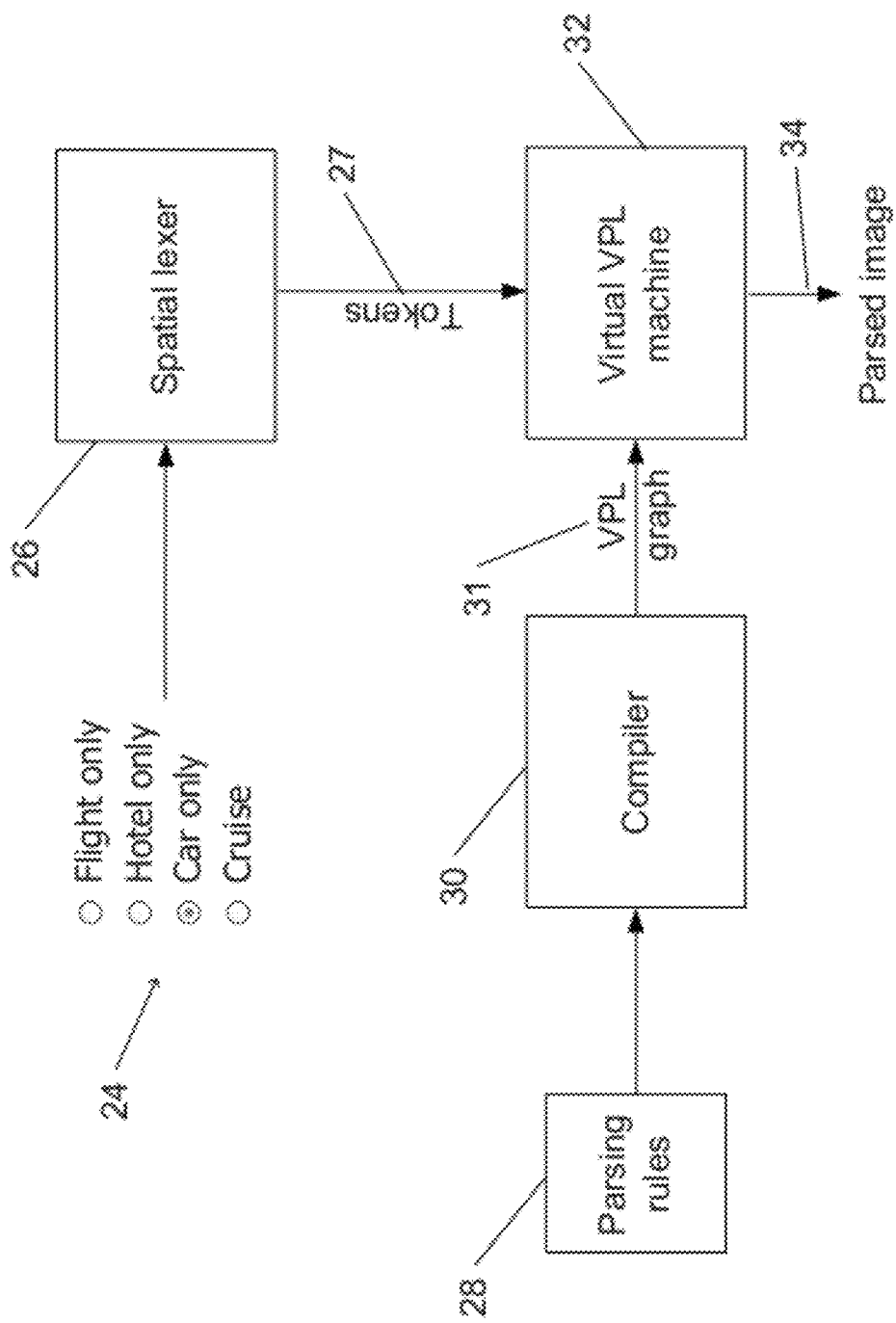
FIG. 2 schematically represents automatic parsing of an image of a structured document, in accordance with an embodiment of the invention.

FIG. 2 schematically represents automatic parsing of an image of a structured document, in accordance with an embodiment of the invention. An image 24 of a structured document is to be automatically parsed. In the example shown, image 24 represents a set of vertically aligned radio buttons with accompanying text. For example, image 24 may have been captured from a display of a GUI.

Image 24 is input to spatial lexer 26. For example, spatial lexer 26 may represent a software or hardware module of an automatic parsing system (such as automatic parsing system 10 in FIG. 1). Spatial lexer 26 is programmed to identify individual elements in image 24. For example, spatial lexer 26 may seek an element in a rectangular region of image 24. The element may be identified with one or more predefined tokens. Such a token may include a member of a set of tokens that were predefined with respect to a type of structured document. For example, if the structured document is a GUI, the set of tokens may include typical screen controls. Examples of such screen controls may include radio buttons, screen buttons, check boxes, text, edit boxes, scrolling arrows, list boxes, dropdown lists, scroll arrows, tabs, and menus. The set of tokens may be customized for a particular application.

In some cases, identification of an element of image 24 with a predefined token may be ambiguous. In such a case, spatial lexer 26 may assign a probability or likelihood value to each possible association or identification of an image element with a token. The identification of image elements with tokens is output from spatial lexer 26 in the form of token output 27. In the case were more than one identification of an image element with a token is possible, token output 27 may include all of the possibilities, with a probability assigned to each possibility.

Token output 27 is input to virtual VPL machine 32. Universal VPL machine 32 parses token output 27 in accordance with parsing rules 28.

Parsing rules 28 are expressed in a VPL format. For example, a user defined template of expected semantically significant elements may be defined in terms of a VPL. A VPL may be defined as a language that can be parsed by a visibly pushdown automaton (VPA). A VPA is a particular form of pushdown automaton (PDA). A VPA may be defined as a 4-tuple, the four elements of which represent a set of states, a stack, an alphabet, and a transition function. In common with other forms of PDA, some of the states are special, such as an initial state and the accepting states. A VPA differs from other forms of PDA with regard to the alphabet and the transition function. The alphabet of a VPA is a union of three sub-alphabets: a local alphabet, call symbols, and return symbols. The transition function is a union of three functions: In accordance with one function, when a call symbol is encountered both a stack push and a transition occur. In accordance with a second function, when a return symbol is encountered both a stack pop and a transition occur. In accordance with a third function, if a local symbol is encountered only a transition occurs. Thus, the resulting language (VPL) may be regarded as including regular expressions with function calls. It has been demonstrated that a VPL is closed under natural operations that include concatenation and the Kleene-* operation (defining a superset that includes the operands).

In accordance with an embodiment of the invention, the language may be a bidirectional language that defines relationships between tokens both horizontally and vertically. Thus, the language is capable of defining relationships between tokens that are aligned either vertically or horizontally.

A parsing rule may be expressed as a language construct of the VPL. For example, parsing rules for describing a set of vertically arranged and aligned screen control lines (e.g. a radio button set such as that shown in image 24) may be expressed as a template rule for a pair of screen control lines (each line including a screen control being horizontally adjacent to text—e.g. a radio button with a label) vertically adjacent to one another in a vertical column, for a single screen control line at the bottom of the column, and vertical concatenation of one or more pairs of screen control lines with a single screen control line, all arranged in a vertical column.

Figure 3:
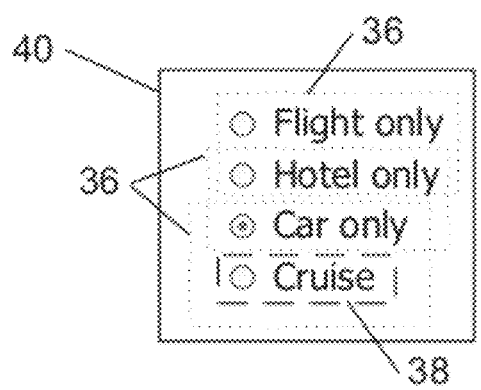
FIG. 3 illustrates application of visibly pushdown language (VPL) language constructs to an image of structured document, in accordance with an embodiment of the invention.

FIG. 3 illustrates application of VPL language constructs to an image of structured document, in accordance with an embodiment of the invention. Radio button set 40 includes a vertically arranged column of radio buttons having associated text.

Using the VPL, each vertical pair of radio button lines 36 of radio button set 40 may be expressed using a (generic) language construct template in a functional form:

RightTitled_M<Object X>=[X C 0..20 Text
L L 0..20
X C 0..20 Text]

RightTitled_M defines a vertically arranged pair of lines in the middle of a column. Each line includes an object X (e.g. a screen control, text, or icon) in, each associated with a text title to its right. The top and bottom lines of the construct indicate that the vertical centers of object X and the text are aligned (vertically center aligned), and that the horizontal space between each object X and the text to its right is between 0 and 20 pixels long. The middle line of the construct indicates that the left edges of objects X and of the texts are aligned (horizontally left aligned), and that the vertical space between the pair of lines is between 0 and 20 pixels long.

Similarly, a bottom radio button line 38 of radio button set 40 may be expressed using the VPL, using a (generic) language construct template in a functional form:

RightTitled_E<Object X>=[X C 0..20 Text]

RightTitled_E defines a line at an end (bottom) of a column. The line includes an object X associated with a text title to its right. Again, object X and the text are vertically center aligned. The space between object X and the text to its right is between 0 and 20 pixels.

Finally, radio button set 40 (RBS) may be defined as a concatenation of pairs as lines and a bottom line:

RBS:=V
(RightTitled_M<RadioButton>*RightTitled_E<RadioButton>)

The colon ":" indicates that that resulting RBS is a complete control. V indicates a vertical concatenation of the arguments. In the expression for RBS, the object "RadioButton" (indicating a radio button object) has been substituted for object X. The Kleene-* operator operating on the argument to its left (indicating pairs of lines) indicates creation of a superset that includes all of the pairs of lines (vertical pairs of radio button lines 36). Thus, several vertical pairs of radio button lines 36 may be combined to form a set of more than two spaced radio button lines. Thus, several vertical pairs of radio button lines 36 and a bottom radio button line 38 may be concatenated to form radio button set 40.

As shown in FIG. 2, parsing rules 28 (defined in terms of VPL language constructs) may be compiled by compiler 30. Compiler 30 may represent a hardware or software module of processor 12 (FIG. 1). The compiler 30 compiles language constructs of the VPL to form a VPL graph 31 of execution elements. The various execution elements (e.g. a graph for one type of screen control, such as a radio button set, and a graph for a second type of screen control, such as a list box) are each independent of the state of the others (referred to as being "stateless").

Token output 27 from spatial lexer 26 and VPL graph 31 are input to virtual VPL machine 32. Virtual VPL machine 32 may be a software module of processor 12 (FIG. 1). Virtual VPL machine 32 is configured to apply VPL graph 31 to token output 27.

Application of VPL graph 31 to token output 27 may result in identifying at least a subset of token output 27 that forms a semantically significant unit (e.g. a radio button set or a list box).

Due to the statelessness of the execution elements of VPL graph 31, virtual VPL machine 32 may be configured to run the execution elements as coroutines (user space threads). Such a configuration enables virtual VPL machine 32 to process token output 27 when token output 27 is probabilistic (including several possible token identifications each accompanied by a probability). For example, if a token has two possible identifications, graphs related to both possible identifications may be applied independently of one another. If application of one graph results in a semantically significant unit while application of the other does not, the application of the graph that results in the semantically significant unit may be assumed to be the correct parsing. If applications of both graphs to both identifications result in semantically significant units, the application that resulted in a greatest calculated probability (as described below) may be assumed to be the correct parsing.

Operation of virtual BPL machine 32 may be understood in connection with the aforementioned example of a radio button set.

Figure 4:
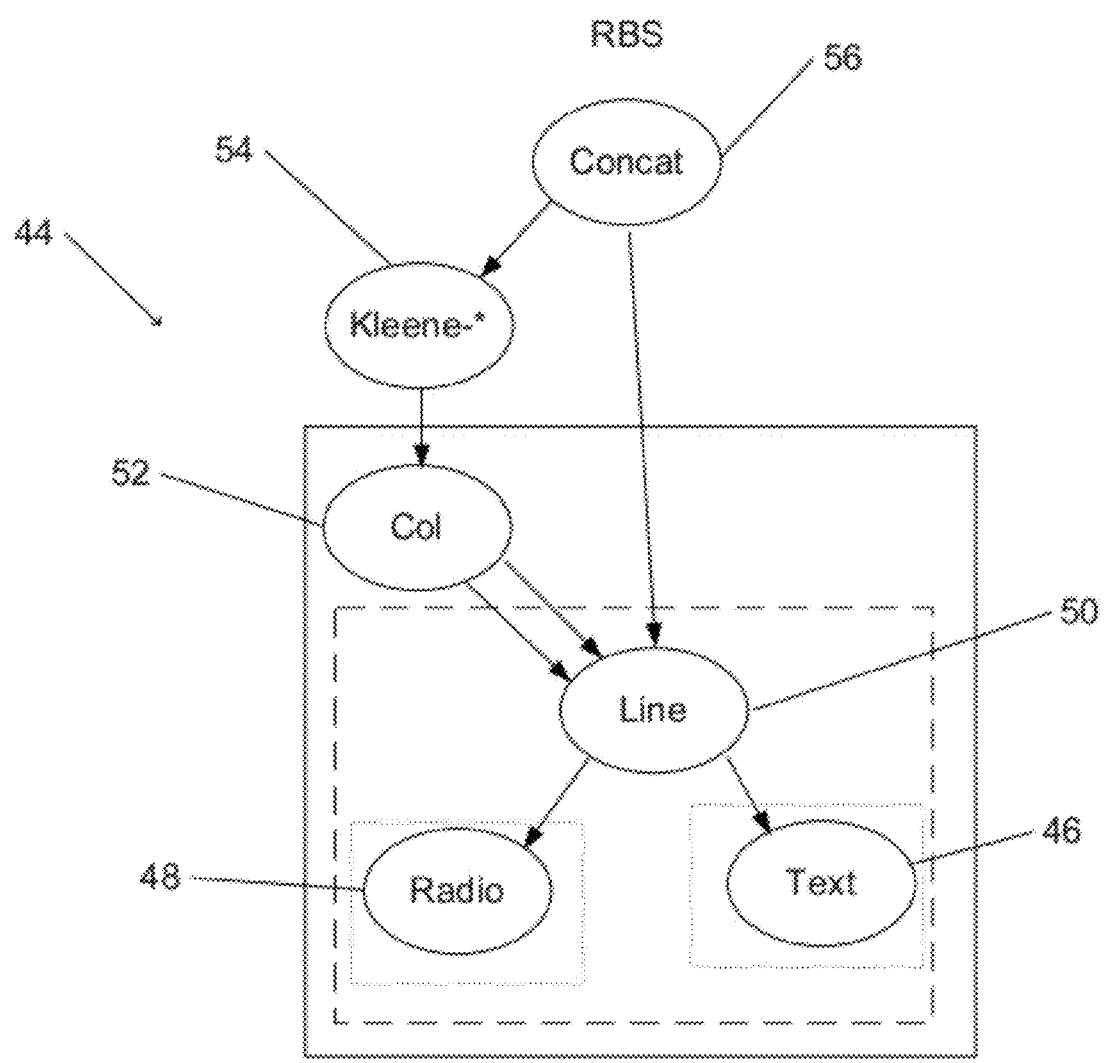
FIG. 4 shows a VPL graph for an example of a radio button set, in accordance with an embodiment of the invention.
Figure 5:
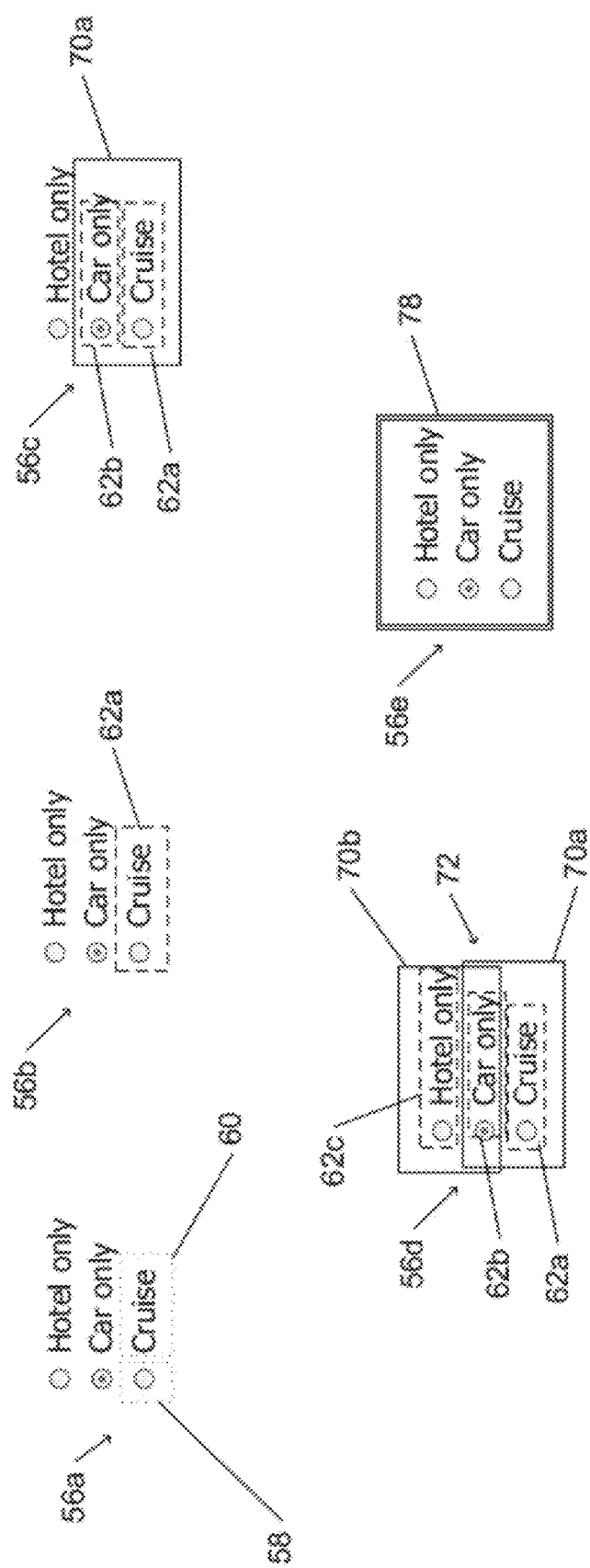
FIG. 5 illustrates application of the VPL graph shown in FIG. 4 to tokens resulting from lexing a radio button set.

FIG. 4 shows a VPL graph for an example of a radio button set, in accordance with an embodiment of the invention. In the example shown, radio button graph 44 represents a VPL graph of the above example of parsing rules for a radio button set. FIG. 5 illustrates application of the VPL graph shown in FIG. 4 to tokens resulting from lexing a radio button set. For simplicity of the description, application of radio button graph 44 to token sets 56a-56e assumes deterministic lexing (a single interpretation of each token).

In a single coroutine, radio button graph 44 is applied to token set 45a from the bottom up. A dynamic programming paradigm is applied in which each token of token set 45a is visited once only. However, the visited token is kept track of. Radio button 48 and text 46 in token set 56a correspond to radio button node 48 and text node 46 of radio button graph 44. Radio button 48 and text 46 are so aligned and spaced such as to enable application of radio button line node 50 of radio button graph 44 (corresponding to "RadioButton C 0..20 Text" in the "RightTitled_M<RadioButton>" and the "RightTitled_E<RadioButton>" language constructs described above). The result is identification of radio button line 62a in token set 56b.

In ascending radio button graph 44 to column node 52, it is indicated (by the pair of arrows pointing from column node 52 to radio button line node 50) that another radio button line is to be identified (by applying radio button node 48, text node 46, and radio button line node 50 to another set of tokens). Thus radio button line 62 is also identified. The alignment and spacing of radio button line 62a and radio button line 62b is such as to enable application of column node 52 (corresponding to the "RightTitled_M<RadioButton>" language construct as described above). Application of column node 52 to radio button lines 62a and 62b results in identification of radio button column 70a in token set 56c.

Ascending radio button graph 44 to Kleene-* node 54 requires identification of all radio button columns. Similar application of column node 52, radio button line node 50, radio button node 48, and text node 46 results in identification of radio button line 62c and of radio button column 70b. Identification of application of radio button columns 70a and 70b enables application of Kleene-* node 54 (corresponding to the "RightTitled_M<RadioButton>" language construct as described above). The result of application of Kleene-* node 54 is identification of radio button column superset 72 in token set 56d.

Finally, radio button graph 44 is ascended to vertical concatenation node 56. As indicated by the arrows, in order to apply vertical concatenation node 56, a superset of radio button columns (such as radio button column superset 72) and a single bottom radio button line (such as radio button line 62a) are required. Upon identification of radio button column superset 72 and radio button line 62a, vertical concatenation node 56 (corresponding to the "V (RightTitled_M<RadioButton>*RightTitled_E<RadioButton>)" language construct described above). The result of application of vertical concatenation node 56 to concatenate radio button column superset 72 and radio button line 62a is identification of radio button set 78. (Concatenation is not identical to the usual (end to end) concatenation operation in that radio button line 62a, here serving as a bottom terminator to radio button set 78, is also part of radio button column superset 72.)

Application of vertical concatenation node 56 to identify radio button set 78 identifies a semantically significant unit in the form of a radio button screen control. Thus, token set 56e may be considered to have been parsed.

Under probabilistic lexing, one or more of the tokens of a token set, such as of token set 56a, may have been ambiguously identified. For example, lexing may have failed to identify whether an image element that includes radio button 58 is in fact to be identified as a radio button (of a radio button set), or whether it is to be identified as a list box opener (of a list box control). The lexer may have assigned a probability to each possibility, e.g. a probability of 0.4 for identification with a radio button, and 0.6 for identification with a list box opener. The parsing proceeds independently along two logical threads. One coroutine (logical thread) corresponds to analysis as if the ambiguous object was a radio button, and includes application of radio button graph 44. Another coroutine corresponds to analysis as if it was a list box opener, and includes application of a similar graph that corresponds to identification of a list box control.

Virtual VPL machine 32 (FIG. 2) may be configured to assign a priority to each logical thread that is present. For example, the highest priority may be assigned to the logical thread with the highest probability at a given time. The probability for each logical thread may change during execution of its corresponding coroutine.

In the example above, thus analysis may first proceed under the assumption that the ambiguous object was a list box opener (higher probability). Application of a graph associated with a list box control may fail upon attempted application of a node of the list box graph whose successful application requires the presence of a list box to the left of the list box opener.

During application of graph, at each node of the graph, a likelihood value may be assigned to a possible identification. At each node of the graph, O may represent an object (e.g.

radio button line or column) that was identified by application of that node. Object O was identified by application of the node to one or more sub-elements S. (For example, a radio button line was identified by application of a node to a radio button and to text. A radio button column was identified by application of a node to two radio button lines.). represents a sub-element (e.g. radio button or list box opener) of object O, the likelihood value of a given identification at a node, likelihood(node), may be expressed as the weighted product:

$$\text{likelihood}(node) = \text{Area}(O) \cdot \prod_{S \subset O} \frac{\text{likelihood}(S)}{\text{Area}(S)}.$$

For each sub-element S, likelihood (S) represents the likelihood value assigned to that sub-element. In the case that a sub-element S had been identified during previous application of another node of the graph (e.g. sub-element S is a radio button line or column), then the value of likelihood (S) results from the calculation associated with the previously applied node. On the other hand, if sub-element S represents a token that was output by the lexer, then likelihood (S) represents the likelihood value that was assigned by the lexer. Area(O) and Area(S) represent the spatial areas of object O and of sub-element S, respectively, and are used to weight the various likelihood (S) values in the product.

Thus, when there virtual VPL machine 32 runs several coroutines, each associated with one of several logical threads (e.g. one thread corresponding to a radio button set and another to a list box) that result from a probabilistic identification of a token by the lexer, a score may be assigned to each thread. The score assigned to a thread is related to the likelihood value that resulted by calculating the value of likelihood(node) for the last node of the corresponding graph. At each point of the parsing, the coroutine that is selected for execution (application of the next node of the corresponding graph) is the coroutine corresponding to that thread whose score indicates that it currently (at this stage of the execution) represents the most likely candidate for parsing. Application of the various nodes and the current score applied to each thread is kept track of by maintaining a return table. Thus, execution may fork to several threads, with the return table keeping track of the current position along application of nodes of each thread.

In this manner, an image of a structured document may be parsed in accordance with an embodiment of the invention, even when lexing of the image is probabilistic. A misidentification made during lexing (or in initial stages of application of parsing rules) may be corrected later on during application, in accordance with an embodiment of the invention, of parsing rules to the tokens. Similarly, application of automatic parsing in accordance to an embodiment of the invention to various images that represent a single structured document may yield identical results, despite minor differences between the images.

Execution of a thread is complete when all nodes of the corresponding VPL graph have been applied (reaching the topmost node of that graph). The result of application of the graph is a semantically significant interpretation of the image (e.g. a radio button set). A likelihood value is assigned is assigned to the interpretation that results from application of that graph. If other threads exist, the corresponding graphs are also applied. If more than one graph is successfully applied, thus enabling more than one semantic interpretation of the image, the interpretation that was assigned the greatest likelihood value is returned by the parser.

Thus, parsing in accordance with a compiled parsing rules expressed in terms of a VPL format may enable parsing that yields a single result in a finite amount of time.

The results of parsing an image of a structured document (e.g. a GUI) may then be utilized by an automatic testing or monitoring application. For example, an automatic testing application may operate screen controls that were identified by the parsing in order to test a program that is associated with the screen controls. An automatic monitoring application may interpret a user's actions when interacting with the GUI based on the identification of screen controls by the parsing.

Figure 6:
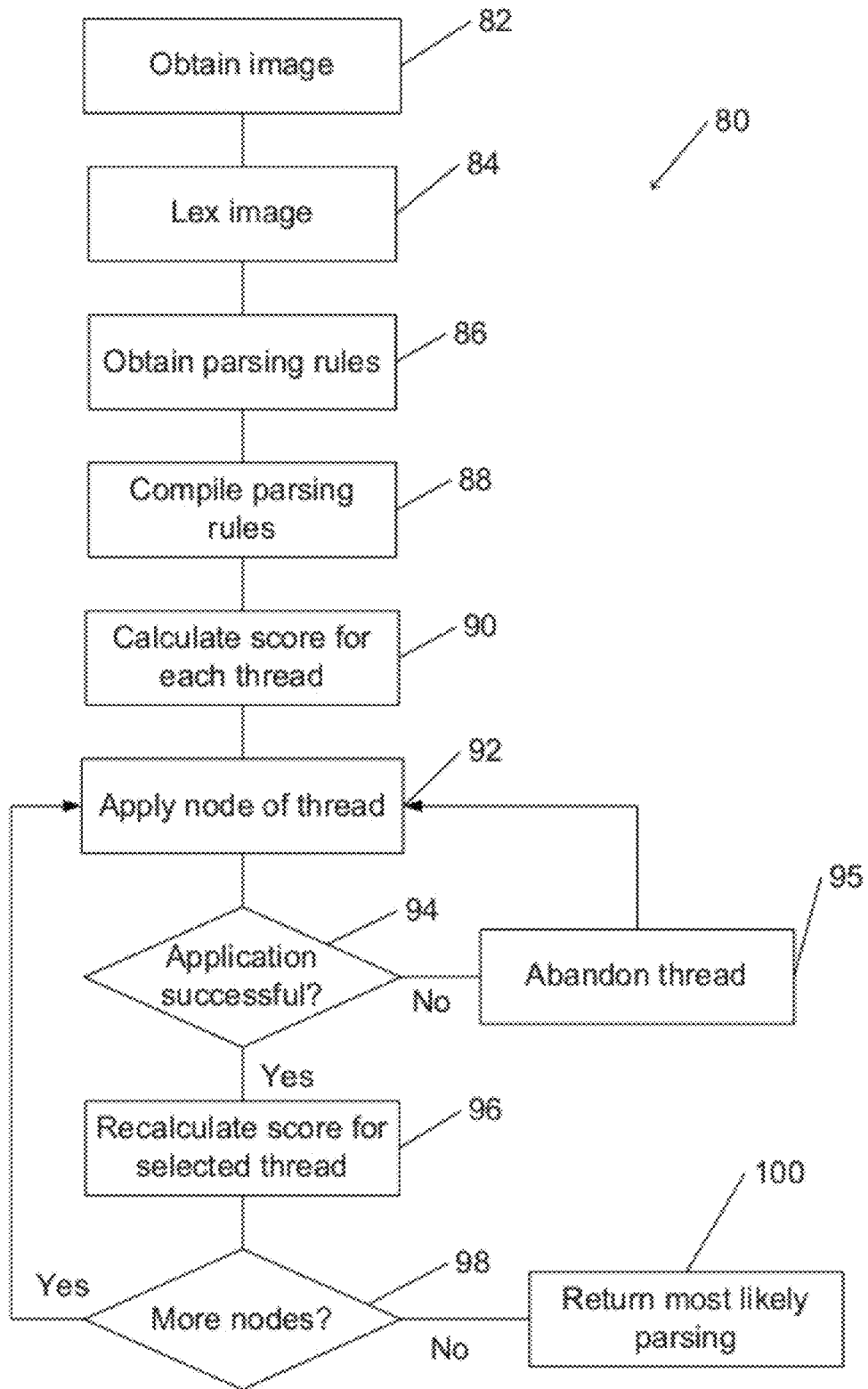
FIG. 6 is a flowchart of a method for automatic parsing of an image of a structured document, in accordance with an embodiment of the invention.

FIG. 6 is a flowchart of a method for automatic parsing of an image of a structured document, in accordance with an embodiment of the invention.

It should be understood that division of the method into discrete steps has been made only for the sake of convenience and for clarity of the description. Alternative division of the method into an alternative set of steps is possible. Execution of such an alternative division into steps would yield equivalent results. All such alternative division into discrete steps should be understood as included within the scope of embodiments of the invention.

Unless stated otherwise, the order of the steps of the method as illustrated in the flowchart has been selected for convenience and for clarity of the description only. Execution of steps of the steps concurrently or in an alternate order would yield equivalent results. Any such reordering of the steps should be understood as included within the scope of embodiments of the invention.

Execution of automatic parsing method 80 on an image of a structured document may yield a semantic representation of the document. In the semantic representation, elements of the image are assigned an interpretation in accordance with their context and relative arrangement. For example, an image of a GUI may be parsed in order to identify screen controls of the GUI. Automatic parsing method 80 may be executed by a processor, such as a processor of an automatic parsing system.

An image of a structured document may be obtained (step 82). For example, an image of a GUI may be captured from a screen or a digital representation of a visually structured document, such as a PDF version of a document, may be input.

A lexer module or application of a processor may probabilistically lex (lexically analyze) the image (step 84). For example, the lexer module may attempt to identify predefined elements (tokens) in the image. When identification of an element with a token is ambiguous such that features of the element are compatible with more than one token, the lexer provides a likelihood value for each possible association or identification of the element with a given token.

Parsing rules are obtained (step 86). The parsing rules may be expressed as language constructs of a VPL. For example, the parsing rules for a GUI may define how various tokens may be arranged relative to one another so as to form a screen control. Parsing rules may have been previously defined, or may be defined by an operator for the context of a particular document.

The parsing rules are compiled so as to obtain a set of instructions that may be applied by a virtual VPL machine for parsing the tokens (step 88). For example, the compiled parsing rules may be represented by a VPL graph. The compilation may have been previously performed and the VPL graph stored, or compilation may be performed for the current image.

The compiled parsing rules may be applied to the image tokens that were identified by the lexer. In the event that the lexer provided more than one possible association of an element with a token, or when a token is compatible with more than one semantic interpretation, application of the parsing rules may involve more than one thread (or coroutine). A score is assigned to each thread (step 90) based on the likelihood of that thread (e.g. based on the likelihood assigned by the lexer to each identification with a token).

A node of one of the threads is selected for application and applied to the tokens (step 92). Typically, the thread selected is the thread that is currently assigned the highest score. The next node of the graph corresponding to the selected thread is selected for application.

Application of the node may or may not be successful (step 94). If application of the node is unsuccessful (e.g. an input element required for successful application of the node has not been identified) then the currently selected thread is abandoned (step 95). Another thread and node are then selected for application (returning to step 92).

If application of the node is successful, the score for the selected thread is recalculated (step 96). The recalculation may be based on the calculation of likelihood(node) as described above, or on another score calculation technique that indicates a current likelihood of success for parsing based on the selected thread.

After application of a node, the graph corresponding to the currently selected thread may or may not include a node that has not yet been applied, or another thread may or may not be active (step 98). If all nodes of the graph corresponding to the currently selected thread have been applied, a possible parsing has been identified and is assigned a likelihood value. If all threads have thus been exhausted, the parsing with the highest likelihood value is returned as the calculated parsing of the image (step 100).

If more nodes of the graph corresponding to the currently selected thread remain to be applied, or if nodes of another thread remain to be applied, another thread and/or node is selected for application (returning to step 92).

In accordance with an embodiment of the invention, a computer program application stored in non-volatile memory or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein, such as a method for issuing and clearing alerts in a distributed computing system in accordance with an embodiment of the invention.

The computer-readable medium may be a non-transitory computer-readable media including all forms and types of memory and all computer-readable media except for a transitory, propagating signal. In one implementation, external memory may be the non-volatile memory or computer-readable medium.

While there have been shown and described fundamental novel features of the invention as applied to one or more embodiments, it will be understood that various omissions, substitutions, and changes in the form, detail, and operation of these embodiments may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method for automated semantic parsing of an image of a structured document, the method comprising:
    acquiring the image of the structured document by an image acquiring device;
    lexing the image of the structured document so as to associate each image element of a plurality of image elements of the image with a predefined token;
    wherein lexing the image comprises associating an element of the image with a plurality of possible tokens, each association with a possible token being assigned a likelihood value;
    inputting a user defined template of expected semantically significant elements of the structured document into a parser, the expected elements being defined in a visibly pushdown language (VPL) format; and
    parsing one or more of the tokens into an element of the expected elements.

2. The method of claim 1, wherein the document is a graphic user interface (GUI).

3. The method of claim 1, wherein inputting the template comprises compiling the template by a compiler.

4. The method of claim 3, wherein compiled output of the compiler comprises a VPL graph of the template.

5. The method of claim 1, wherein parsing comprises execution of execution elements of a plurality of coroutines.

6. The method of claim 5, comprising selecting for execution an execution element of a coroutine of said plurality of coroutines based on a score that is assigned to each coroutine, the score representing a likelihood of an object that was identified during execution of an execution element of that coroutine.

7. The method of claim 6, wherein the score is calculated on the basis of a weighted product of likelihood values of sub-elements of the object.

8. A non-transitory computer readable medium having stored thereon instructions that when executed by a processor will cause the processor to perform the method of:
    lexing an acquired image of a structured document so as to associate each image element of a plurality of image elements of the image with a predefined token;
    wherein the lexing the image comprises associating an element of the image with a plurality of possible tokens, each association with a possible token being assigned a likelihood value;
    inputting a user defined template of expected semantically significant elements of the structured document into a parser, the expected elements being defined in a visibly pushdown language (VPL) format; and
    parsing one or more of the tokens into an element of the expected elements.

9. The computer readable medium of claim 8, wherein the document is a graphic user interface (GUI).

10. The computer readable medium of claim 8, wherein inputting the template comprises compiling the template by a compiler.

11. The computer readable medium of claim 10, wherein compiled output of the compiler comprises a VPL graph of the template.

12. The computer readable medium of claim 8, wherein parsing comprises execution of execution elements of a plurality of coroutines.

13. The computer readable medium of claim 12, comprising selecting for execution an execution element of a coroutine of said plurality of coroutines based on a score that is assigned to each coroutine, the score representing a likelihood of an object that was identified during execution of an execution element of that coroutine.

14. The computer readable medium of claim 13, wherein the score is calculated on the basis of a weighted product of likelihood values of sub-elements of the object.

15. A system comprising a processor and a computer readable medium connected to the processor, wherein the computer usable medium contains a set of instructions to:
   lex an acquired image of a structured document so as to associate each image element of a plurality of image elements of the image with a predefined token;
   wherein the lexing the image comprises associating an element of the image with a plurality of possible tokens, each association with a possible token being assigned a likelihood value;
   receive a user defined template of expected semantically significant elements of the structured document into a parser, the expected elements being defined in a visibly pushdown language (VPL) format; and
   parse one or more of the tokens into an element of the expected elements.

16. The system of claim 15, comprising an image acquiring device for acquiring the image.

17. The system of claim 16, wherein the image acquiring device comprises a scanner or a screen capture device.

18. The system of claim 15, comprising a compiler for compiling the template.

\* \* \* \* \*